United States Patent [19]

Toyama et al.

[11] Patent Number: 5,678,171

[45] Date of Patent: Oct. 14, 1997

[54] MOBILE RECEIVER FOR SATELLITE BROADCAST DURING FLIGHT

[75] Inventors: Noboru Toyama; Masaru Fujita; Osamu Ono; Hisaji Nakamura, all of Tokyo, Japan

[73] Assignees: Nippon Hoso Kyokai; All Nippon Airways Co., Ltd., both of Tokyo, Japan

[21] Appl. No.: 646,560

[22] Filed: May 8, 1996

Related U.S. Application Data

[63] Continuation of Ser. No. 155,791, Nov. 23, 1993, abandoned.

[30] Foreign Application Priority Data

Nov. 30, 1992 [JP] Japan ................. 4-320444
Nov. 30, 1992 [JP] Japan ................. 4-320445

[51] Int. Cl.$^6$ ............................ H04H 1/00
[52] U.S. Cl. .................. 455/3.2; 455/275; 455/280; 455/345; 342/359; 343/705; 343/872
[58] Field of Search ................. 455/3.2, 12.1, 455/54.1, 25, 272, 273, 276.1, 280, 344, 345; 342/359, 368; 343/705, 708, 720, 872; H01Q 1/28, 1/50

[56] References Cited

U.S. PATENT DOCUMENTS

| | | | |
|---|---|---|---|
| 4,079,318 | 3/1978 | Kinoshita | 455/273 X |
| 4,630,056 | 12/1986 | Noguchi et al. | 342/359 X |
| 4,841,303 | 6/1989 | Anderson | 342/359 |
| 5,173,708 | 12/1992 | Suzuki et al. | 342/359 |
| 5,296,862 | 3/1994 | Rodeffer | 342/359 |
| 5,323,170 | 6/1994 | Lang | 343/705 X |
| 5,347,286 | 9/1994 | Babitch | 342/359 |

FOREIGN PATENT DOCUMENTS

| | | |
|---|---|---|
| 0 452 970 | 10/1991 | European Pat. Off. |
| 0 540 124 | 5/1993 | European Pat. Off. |
| 0 540 125 | 5/1993 | European Pat. Off. |

OTHER PUBLICATIONS

Patent Abstracts of Japan, vol. 12, No. 303 (P-746), Aug. 18, 1988 (JP-A-63 075 687).

Taira et al, "High Gain Airborne Antenna for Satellite Communications", *IEEE Transactions On Aerospace and Electronic Systems*, vol. 27, No. 2, pp. 354-359, Mar., 1991.

Huang, "L-Band Phased Array Antennas for Mobile Satellite Communications", *37th IEEE Vehicular Technology Conference*, pp. 113-117, Jun., 1987.

Taira et al "High Gain Airborne Antenna for Satellite Communications" IEEE Transactions On Aerospace, vol. 27 #2 pp. 354-359, Mar. 1991.

*Primary Examiner*—Reinhard J. Eisenzopf
*Assistant Examiner*—Philip J. Sobutka
*Attorney, Agent, or Firm*—Shapiro and Shapiro

[57] ABSTRACT

A mobile receiver for satellite broadcast comprises directive antennas, a navigation unit for generating a navigation signal representing a position and an attitude of an airplane, a control unit for generating a control signal for controlling the antennas, on the basis of the navigation signal from the navigation unit and prestored information indicating a position of a broadcasting satellite, and a drive unit for driving the antennas in response to the antenna control signal from the control unit to orient the directivity of the antennas toward the broadcasting satellite.

20 Claims, 7 Drawing Sheets

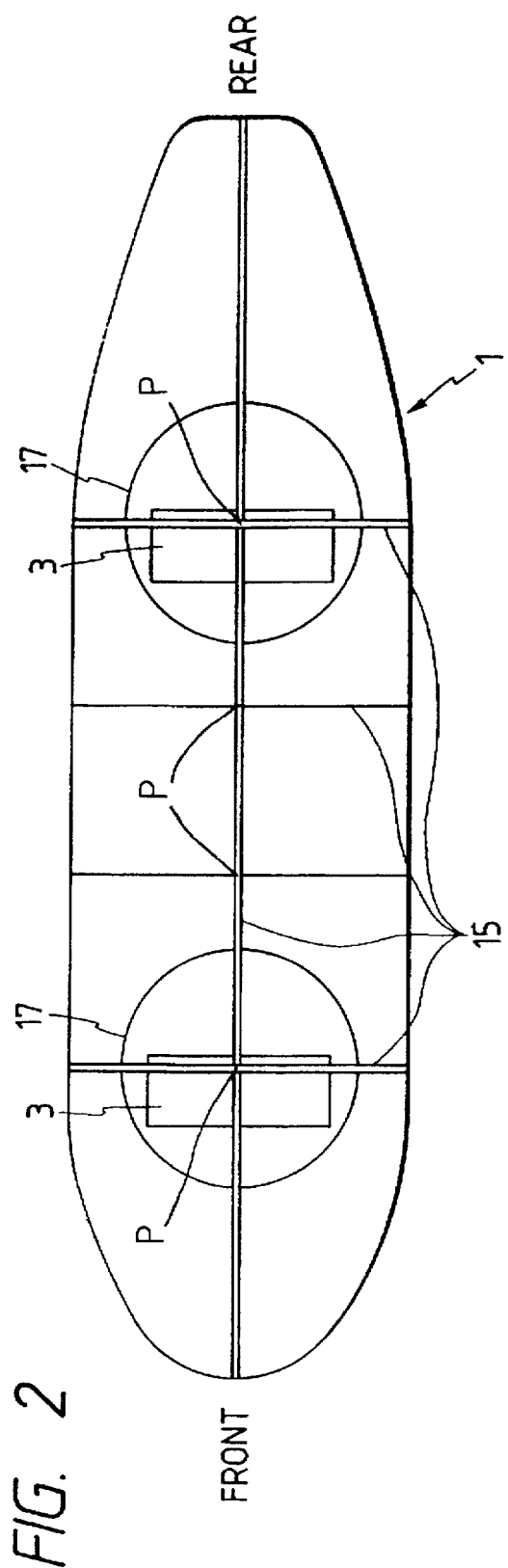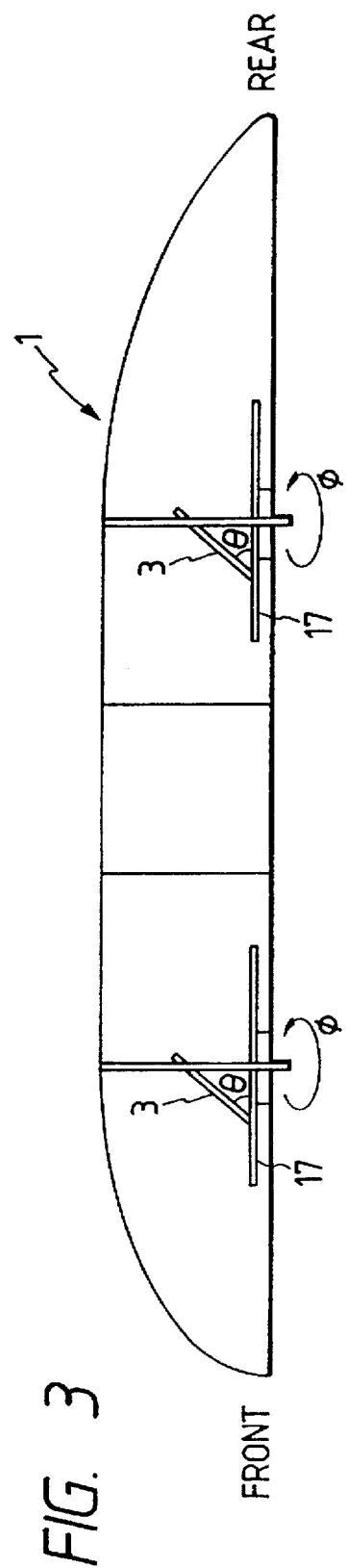
FIG. 2
FIG. 3

FIG. 4

| | PARITY | CODE | | | DATA (VALUE OF ATTITUDE, ALTITUDE, PLACE etc.) | | | | | | | | | | | | | | | | | | INPUT OUTPUT IDENTIFI-CATION CODE | | LABEL | | | | | | | |
|---|---|---|---|---|---|---|---|---|---|---|---|---|---|---|---|---|---|---|---|---|---|---|---|---|---|---|---|---|---|---|---|---|
| BIT VALUE | | | | | | | | | | | | | | | | | | | | | | | | | 1 | 2 | 4 | 1 | 2 | 4 | 1 | 2 |
| LOGIC VALUE | 1 | 1 | 1 | 0 | 0 | 0 | 1 | 0 | 0 | 0 | 1 | 0 | 0 | 0 | 0 | 0 | 0 | 0 | 0 | 0 | 0 | 0 | 0 | 0 | 0 | 0 | 0 | 1 | 0 | 0 | 1 | 1 |
| BIT NUMBER | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |

FIG. 5

| ANGLE (deg) | 0 | 22.5 | 45 | 67.5 | 90 | 112.5 | 135 | 157.5 | 180 | 202.5 | 225 | 247.5 | 270 | 292.5 | 315 | 337.5 |
|---|---|---|---|---|---|---|---|---|---|---|---|---|---|---|---|---|
| C/N (dB) | 9.5 | 9.5 | 9.75 | 9.5 | 9.5 | 9.25 | 9.25 | 8.75 | 8.75 | 9 | 9.5 | 9.5 | 9.5 | 9.75 | 9.5 | 9.5 |

FIG. 6

| ANGLE (deg) | 0 | 22.5 | 45 | 67.5 | 90 | 112.5 | 135 | 157.5 | 180 | 202.5 | 225 | 247.5 | 270 | 292.5 | 315 | 337.5 |
|---|---|---|---|---|---|---|---|---|---|---|---|---|---|---|---|---|
| C/N (dB) | 8.75 | 9 | 9.25 | 9.5 | 9.5 | 9.5 | 9.6 | 9.6 | 9.5 | 9.5 | 9.5 | 10 | 9.5 | 9.25 | 9.25 | 8.75 | ns/

MOBILE RECEIVER FOR SATELLITE BROADCAST DURING FLIGHT

This is a continuation of application Ser. No. 08/155,791 filed Nov. 23, 1993, now abandoned.

BACKGROUND OF THE INVENTION

1. Field of the Invention

The present invention relates to a mobile receiver for satellite broadcast which can receive an electromagnetic wave of the satellite broadcast during flight.

2. Related Background Art

An apparatus for receiving image information of a satellite broadcast while moving has been developed or in an experimental stage for train, ship, bus and small car. In the prior art apparatus, since a plurality of antennas on a flat plate are directed to a broadcasting satellite by using outputs of tracking sensors attached to the plate, the same number of tracking circuits as the number of divisions of the apparatus are required when the apparatus is divided. Thus, a different technical requirement is imposed to an apparatus that is composed of several subdivided apparatuses, for receiving image information of the satellite broadcast during the flight of an airplane. The prior art tracking system in the apparatus is a mechanical tracking system or a combination of the mechanical tracking system and an electronic tracking system, and a total electronic tracking system has not yet been developed.

SUMMARY OF THE INVENTION

It is an object of the present invention to provide a compact and lightweight mobile receiver for satellite broadcast for stably receiving an electromagnetic wave of the satellite broadcast in all attitudes of an airplane by combining outputs of a plurality of antennas.

It is another object of the present invention to provide a mobile receiver for satellite broadcast which can direct antennas of the apparatus to the satellite broadcast by a simple circuit without regard to the number of divisions of the apparatus by using navigation data derived from the airplane.

The above objects are achieved by the present invention by providing a mobile receiver for satellite broadcast comprising:

directive antenna means;

a navigation unit for generating a navigation signal representing a position and an attitude of an airplane;

control means for generating a control signal for controlling the antenna means, on the basis of the navigation signal from the navigation unit and prestored information indicating a position of a broadcasting satellite; and drive means for driving the antenna means in response to the antenna control signal from the control means to orient directive directions of the antenna means toward the broadcasting satellite.

It is another object of the present invention to provide a mobile receiver for satellite broadcast which eliminates mechanically moving elements by using a totally electronic tracking system to improve a reliability under vibration and attain faster tracking of the satellite.

The above object of the present invention is achieved by providing a mobile receiver for satellite broadcast comprising:

directive antenna means including a plurality of antennas arranged in a radome with different antenna orientations to cover all azimuths;

a navigation unit for generating a navigation signal representing a position and an attitude of an airplane;

control means for generating an antenna control signal to select antennas to be used for receiving the electromagnetic wave, on the basis of the navigation signal the data of the navigation unit; and composition means for selecting the antenna means in response to the antenna control signal from the control means and for in-phase composing signals received by the selected directive antenna means.

Other objects of the present invention will be apparent from the following detailed description of the preferred embodiments and the accompanying drawings.

BRIEF DESCRIPTION OF THE DRAWINGS

FIG. 2 shows a plan view of an antenna mounted in a radome 1 of the present invention, FIG. 3 shows a side view of the antenna mounted in the radome 1 of the present invention, FIG. 4 shows 32-bit digital signal data representing a latitude of an airplane used for the control of the antenna of the present invention, FIG. 5 shows a table of transmittance of an electromagnetic wave measured by an antenna mounted at the front of the radome 1 of the present invention, FIG. 6 shows a table of transmittance of an electromagnetic wave measured by an antenna mounted at the rear of the radome 1 of the present invention.

DETAILED DESCRIPTION OF THE PREFERRED EMBODIMENTS

Figure 1:
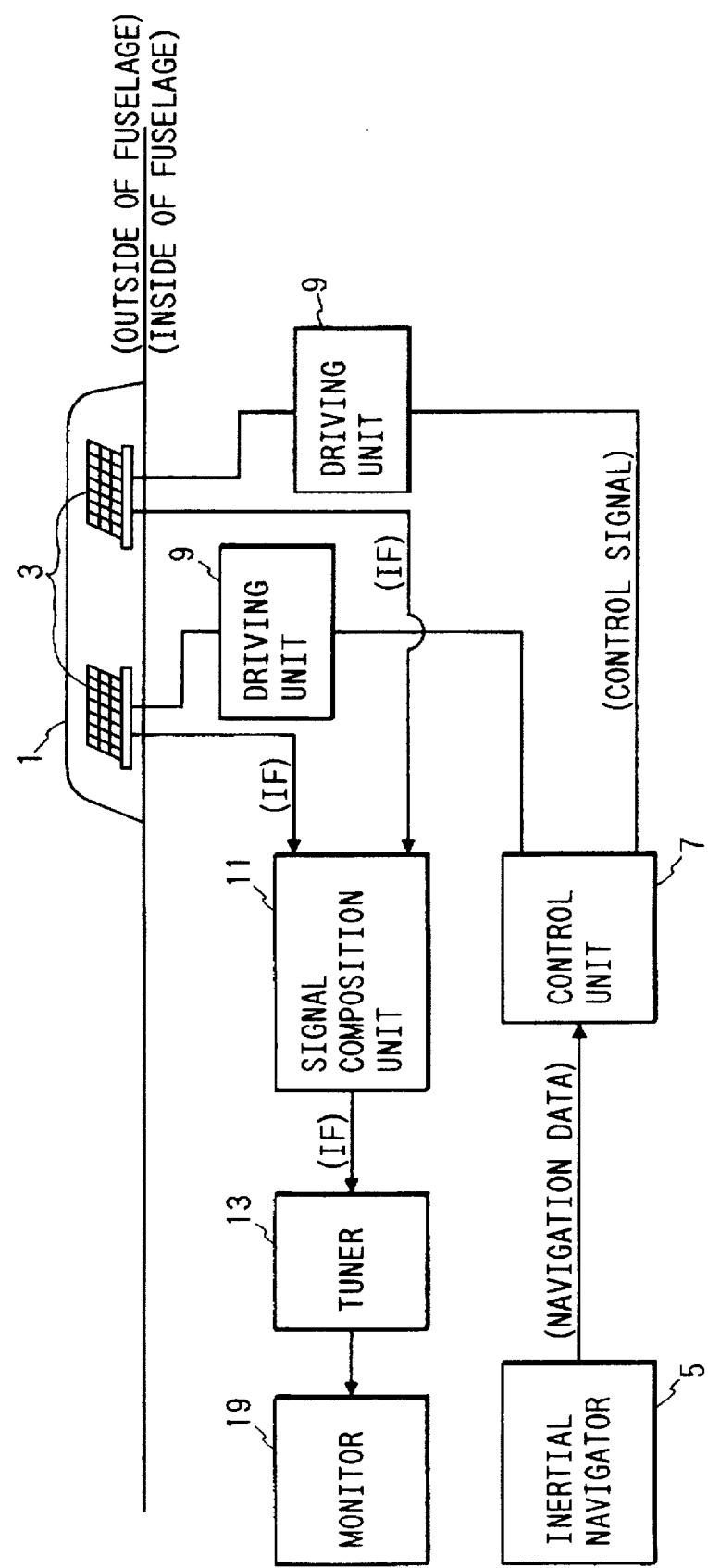
FIG. 1 shows a block diagram of a first embodiment of the present invention.

The preferred embodiments of the present invention are now described.

<First Embodiment>

The present mobile receiver for satellite broadcast comprises a radome 1 made of FRP, directive antennas 3 such as array antennas, phased antennas or parabola antennas, an inertial navigator 5 which outputs navigation data during flight, a control unit 7 for obtaining control signal for controlling a directive directions of the antennas 3, on the basis of the navigation data, a drive units 9 for directing the antennas toward satellite broadcast by using the control signal from the control unit 7, and a signal composition unit 11 for in-phase composing signal outputs received by the antennas 3. The signal composition unit 11 in-phase composes the intermediate frequency outputs from the antennas.

Each of antennas 3 is a rectangular antenna of approximately 15 cm×approximately 40 cm, and one side of a dielectric substrate is a ground plane and the opposite side has approximately 200 radiation elements regularly arranged thereon. Since it is assumed that the present apparatus is used at a high altitude at which an air pressure falls to one quarter of that at the ground, a material of the antenna substrate is a composite rigid substrate of polyethylene and air or a composite substrate material of polytetrafluoroethylene and glass fiber, which provides a high gain and is not broken under a reduced pressure.

The inertial navigator 5 determines a position and an attitude of an airplane by an auto-inference navigation method and it generates data on the direction of travel of the airplane, a pitching angle, a rolling angle, an altitude, a latitude and a longitude as well as other data necessary for the navigation of the airplane in the form of 32-bit digital signal as defined by the AEEC (Aero-Electronic Engineering Committee). For example, a digital signal of FIG. 4 represents a current latitude of the airplane. The bit sequences of other data are continuously outputted at a predetermined convention, and the control unit 7 first detects only the bit sequences of the data relating to the attitude, altitude and position which are necessary for the present invention. The type of the information is defined by a label represented by the first 8-bit (bits 1–8) of the bit sequence. In FIG. 4, the first 8 bits '11001000' represent a label 310. The control unit 7 recognizes the bit sequence as latitude data, for example. Other data are detected in a similar manner. The control unit 7 detects the bit sequence of data necessary for the control of the antenna by the label and generate concrete data based on the bit sequence subsequent to bit 9. It generates a control signal to direct the antenna 3 toward the satellite broadcast by the concrete data and a process logic prestored in a ROM (read-only memory) of the control unit 7. The drive unit 9 drives the antenna 3 at a pitch of 0.1 degree. Without such a precision, the electromagnetic wave of the satellite broadcast could not be received. The control unit 7, the drive unit 9, the signal composition unit 11, a tuner 13 and a monitor 19 are accommodated in a fuselage of the airplane which is a pressurized area, as shown in FIG. 1 in order to protect them from a temperature change. Only the antennas 3 are mounted externally of the fuselage and are covered with the radome 1.

FIGS. 2 and 3 show a construction in which a plurality of divided antennas are accommodated in the radome 1 on the fuselage of the airplane. Two antennas 3 are mounted at the front and rear of the radome 1. An arrester (lightning arrester) 15 is bonded to a wall of the radome 1. The arrester 15 may be an array of band-shaped or bar-shaped metal members or disk-shaped metal members. In the form shown, the arrester 15 includes a metal member oriented longitudinally of the radome 1 (i.e., in the front-to-rear direction of the radome) and a plurality of metal members oriented laterally of the radome (top-to-bottom direction in FIG. 2) and crossing the longitudinally oriented metal member at crossing points P spaced longitudinally along the radome. In order to reduce interference of electromagnetic wave to the antennas 3 by the arrester 15, the antennas 3 are arranged as for from the arrester 15 as possible. In the illustrative embodiment, the front and rear antennas are situated, respectively, beneath the front-most and rear-most crossing points P, with the two intermediate laterally oriented metal members having positions, along the longitudinal direction of the radome, between those of the two antennas. The two antennas 3 are mounted on turn tables 17 and the rotation angle $\phi$ of the turn table 17 and the angle of inclination $\theta$ of the antenna 3 are controlled by the control unit 7 and the drive unit 9 shown in FIG. 1 so that the two antennas 3 are always directed toward the broadcasting satellite regardless of the position and the attitude of the airplane. As can be seen in FIGS. 2 and 3, the crossing point P corresponding to each antenna is substantially coincident with the rotation axis of the antenna. The antennas 3 may be of any type so long as they can receive the satellite broadcast, but a planar antenna is preferable in view of compactness. During flight, the inside and the outside of the radome are substantially at the same temperature and hence there is a very large temperature range. Accordingly, the material for the mechanical elements of the antenna is preferably polytetrafluoroethylene (durable temperature 260° C. to −270° C.) which is durable to not only a high temperature but also a low temperature.

Figure 7:
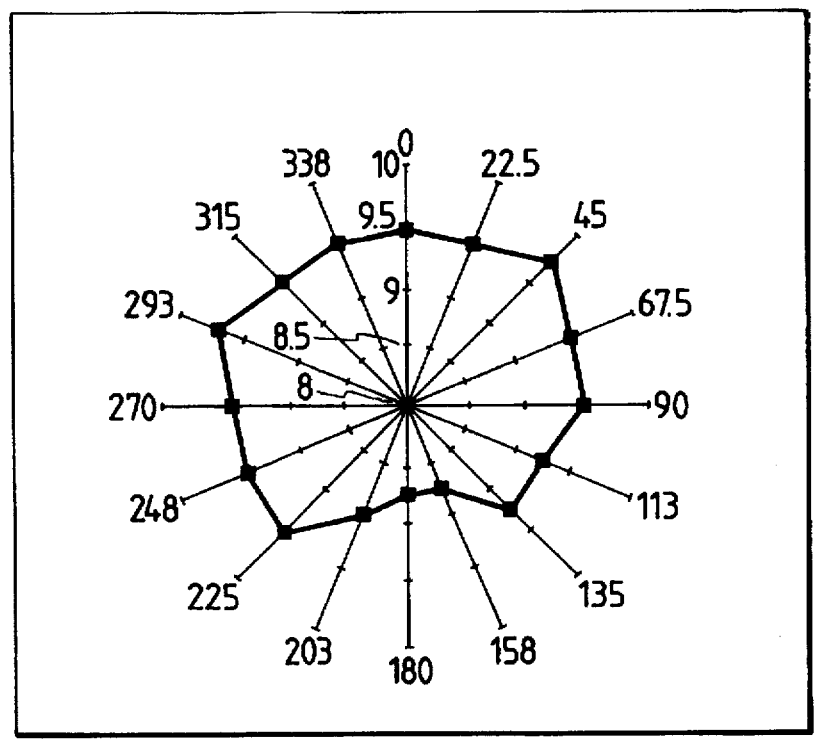
FIG. 7 shows characteristics of the transmittance of the electromagnetic wave measured by the antenna mounted at the front of the radome 1 of the present invention.
Figure 8:
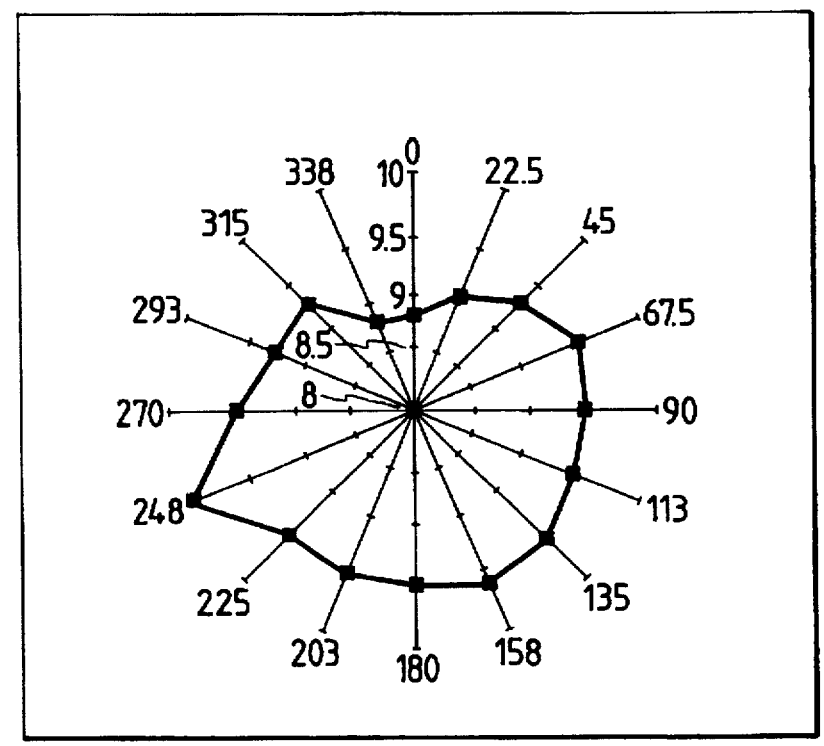
FIG. 8 shows characteristics of the transmittance of the electromagnetic wave measured by the antenna mounted at the rear of the radome 1 of the present invention.
Figure 9:
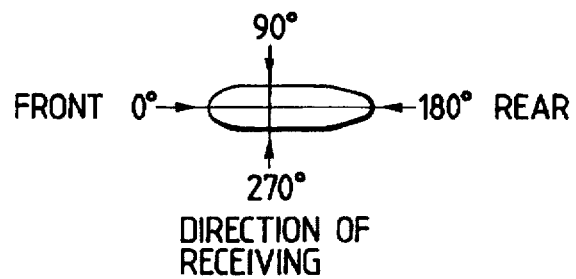
FIG. 9 shows a direction of reception of the electromagnetic wave in the present invention.

FIGS. 5 to 8 show results of measurement of the transmittance of the electromagnetic wave when the antennas are arranged in the radome having the arrester bonded thereto as shown in FIGS. 2 and 3 and the azimuth is changed by 22.5 degrees at a time. A receiving C/N ratio by one antenna not covered by the radome having the arrester bonded thereto is 11 dB. The direction of the electromagnetic wave relative to the radome is oriented as shown in FIG. 9. For example, when the electromagnetic wave is directed from the front of the radome, the antenna is controlled and driven to be oriented as shown in FIGS. 2 and 3. This corresponds to the angle 0 degree of the measurement. As seen from the tables of FIGS. 5 and 6, the receiving C/N ratio of the antenna mounted at the front of the radome is 9.5 dB and the receiving C/N ratio of the antenna mounted at the rear is 8.75 dB. In the front mounting, the receiving C/N ratio is 1.5 dB lower than that attained when the radome is not attached because of the effect of the radome and the arrester. In the rear mounting, the receiving C/N ratio is 2.25 dB lower than that attained when the radome is not attached because of the effect by the two arresters arranged between the antennas. The receiving C/N ratios are different between the front mounting and the rear mounting depending on the angle of incidence of the electromagnetic wave, but when the radar charts of the antenna gains of FIGS. 7 and 8 are combined, it provides an antenna gain which is uniform in substantially all directions. Namely, by combining the received signals from the two antennas, the output is substantially constant.

By demodulating the image signal by the tuner 13 and selecting a channel, the satellite broadcast can be watched on the monitor 19.

Figure 10:
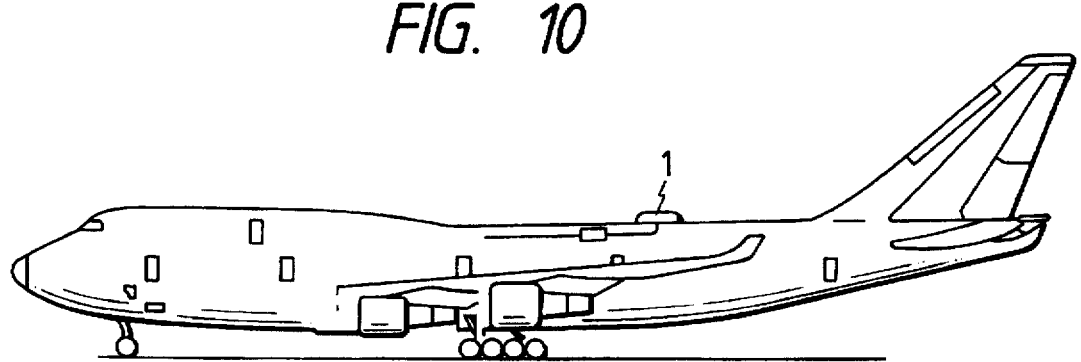
FIG. 10 shows a mounting position of the radome 1 of the present invention.
Figure 11:
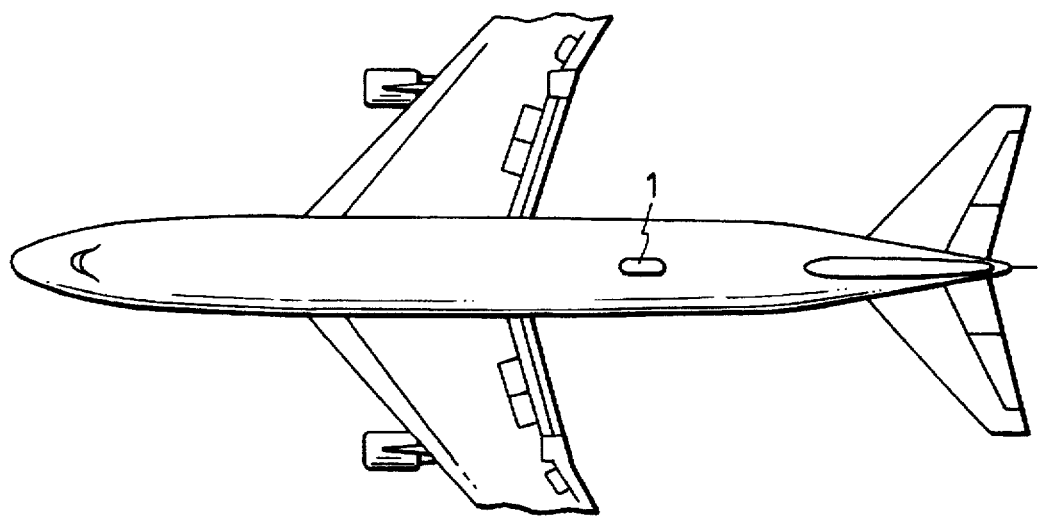
FIG. 11 shows a mounting position of the radome 1 of the present invention.

FIGS. 10 and 11 show a mount position of the radome on the airplane.

<Second Embodiment>

Figure 12:
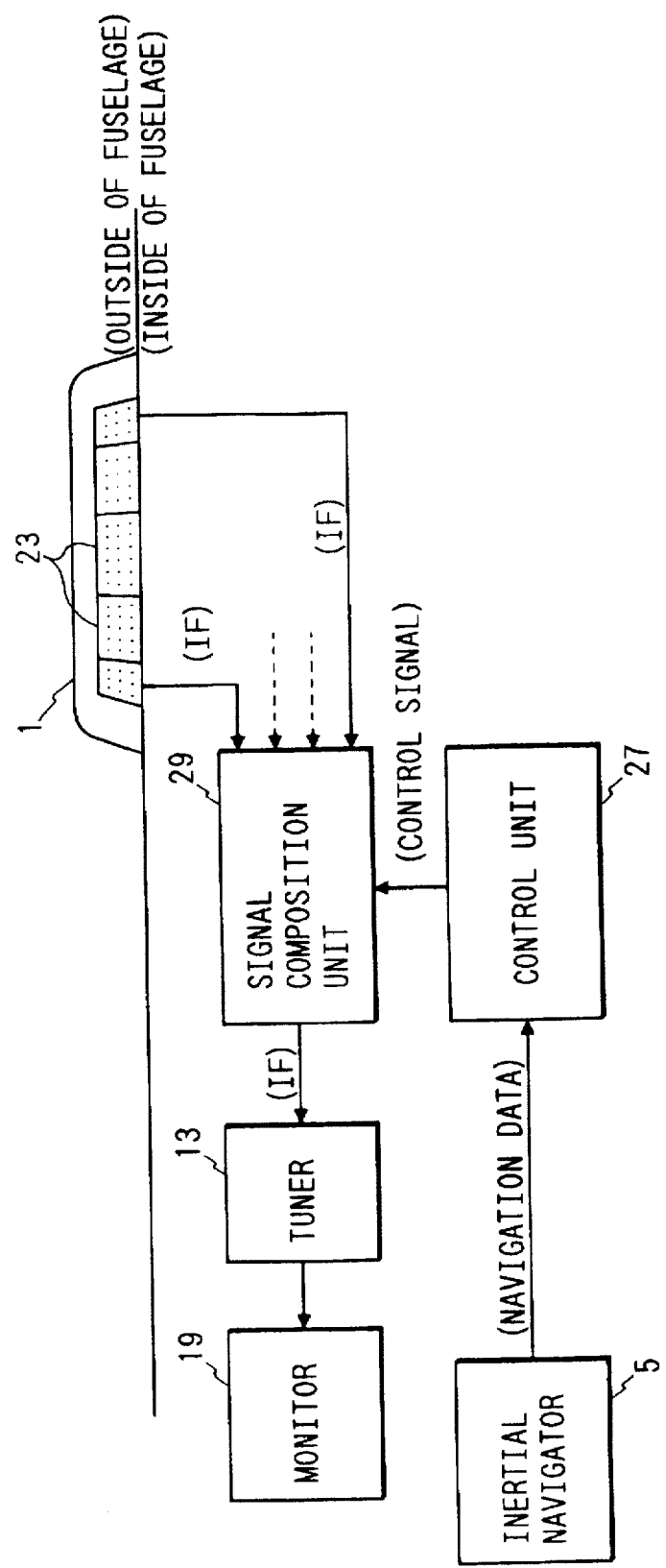
FIG. 12 shows a block diagram of a second embodiment of the present invention.

Referring to FIG. 12, present mobile receiver for the satellite broadcast comprises a radome 1 made of FRP, directive array antennas 23, an inertial navigator 5 for outputting navigation data during flight, a control unit 27 for generating a control signal to select the array antennas 23 and a signal composition unit 29 for in-phase composing the outputs of the signals received from the array antennas 23. The control unit 27, the signal composition unit 29, the tuner 13 and the monitor 19 are accommodated in the fuselage of the airplane, which is a pressurized area, as shown in FIG.

12 to protect them from a temperature change. Only the array antennas 23 are mounted externally of the fuselage and are covered with the radome 1.

The radome 1, the inertial navigator 5, the tuner 13 and the monitor 19 which are designated by the same numerals as those of the first embodiment have been explained above and the explanation thereof is omitted here.

The inertial navigator 5 generates a control signal to select the array antennas 23.

During the flight, a temperature of inside of the radome 1 and a temperature of outside of the radome 1 are substantially same and a very large temperature range is encountered. Accordingly, the substrate material of the array antennas 3 is preferably the same as that of the first embodiment.

A configuration of the airplane-mounted mobile receiver for the satellite broadcast is now explained. Twelve array antennas 23 are arranged in the radome 1 which is outside of the fuselage. Each array antenna 23 is divided into 6×4 blocks (not shown) and signals received by the array antenna 23 are in-phase composed by the in-phase composition circuit 37 after the received signals have been converted to intermediate frequency, and the in-phase composed signal is supplied to the signal composition unit 29 in the fuselage as a output of the array antenna 23. On the other hand, the control unit 27 calculates the direction of the broadcasting satellite on the basis of the data of the inertial navigator 5 mounted in the airplane, determines the array antennas 23 which can currently receive the electromagnetic wave, and the control unit 27 sends a control signal to the signal composition circuit 29. The signal composition unit 29 selects two or more optimum signals from the outputs of the twelve array antennas 23 on the basis of the control signal from the control unit 27 and in-phase composes them.

Figure 13:
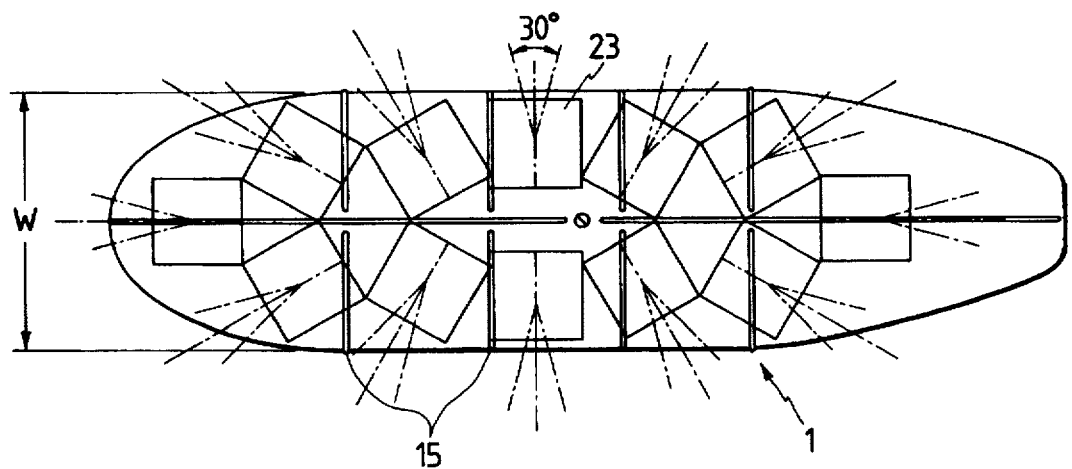
FIG. 13 shows a plan view of an antenna mounted in a radome 1 of the present invention.
Figure 14:
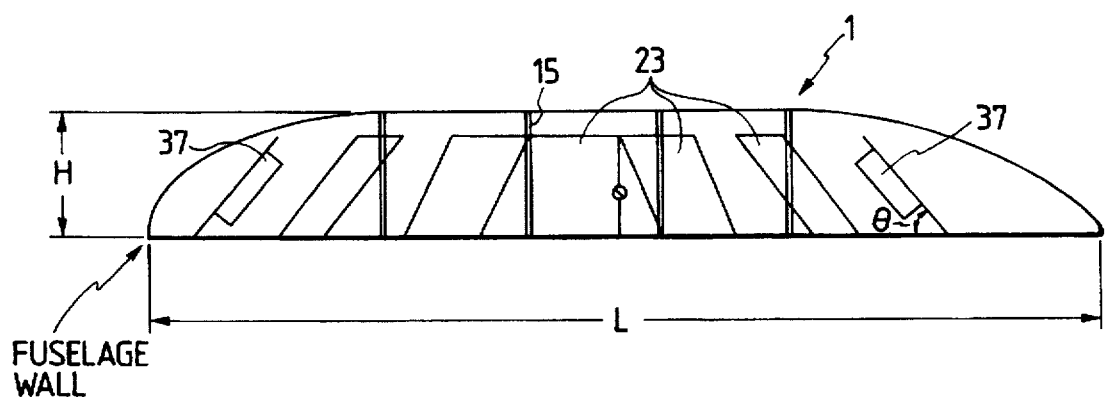
FIG. 14 shows a side view of the antenna mounted in the radome 1 of the present invention.
Figure 15:
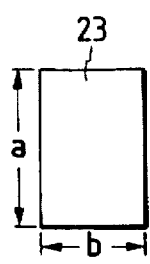
FIG. 15 shows a front view of the antenna of the present invention.
Figure 16:
FIG. 16 shows a side view of the antenna of the present invention.

FIGS. 13 and 14 show a method for mounting the array antennas 23 in the radome 1 on the fuselage of the airplane. In the present embodiment, twelve array antennas 23 having dimensions a vertically and b horizontally (FIG. 15) are arranged at a pitch of 30 degrees. An elevation is at an angle θ relative to the mounting plane. Each array antenna 23 is divided into 6×4 blocks (not shown) and all of the 24 blocks are in-phase composed to produce the output of one array antenna 23. The number, mounting angle, the number of divisions and the manner of divisions of the array antennas 23 may be changed depending on the directivity of the basic antenna element. In accordance with the present invention, the antennas may be directed to the broadcasting satellite without regard to the number of apparatus by a simple circuit by using the navigation data derived from the inertial navigator. The arrester bonded to the surface of the radome significantly affects to the transmittance of the electromagnetic wave in view of the positional relation with the antennas mounted in the radome, but the electromagnetic wave of the broadcasting satellite can be received at a very high level by in-phase composing the electromagnetic waves received by the plurality of antennas arranged in the radome.

Since the present apparatus uses the total electronic tracking system, the reliability is improved and the faster tracking is attained.

Accordingly, the electromagnetic wave of the broadcasting satellite can be stably received at all attitudes of the airplane.

What is claimed is:

1. A mobile receiver for a satellite broadcast that includes a video image signal, comprising:
   a radome having a lightning arrester mounted thereon;
   a plurality of directional antennas constructed to receive the satellite broadcast, said antennas being covered by said radome and mounted to corresponding drives that adjust inclinations and rotation angles of the respective antennas;
   an inertial navigation unit for generating a navigation signal representing a position and an attitude of an airplane;
   control means for generating an antenna control signal for controlling the antenna drives, based on the navigation signal from said navigation unit and pre-stored information indicating a position of the satellite, the antenna drives adjusting the inclinations and rotation angles of said antennas in accordance with the antenna control signal from said control means to orient said antennas toward the satellite; and
   composition means for in-phase combining outputs from said antennas in an intermediate frequency (IF) band;
   said lightning arrestor including a metal member oriented longitudinally of said radome and a plurality of metal members oriented laterally of said radome and crossing said longitudinally oriented metal member at crossing points spaced longitudinally along said radome,
   the metal members of said lightning arrestor being disposed relative to said antennas such that each antenna is situated beneath a corresponding crossing point, and such that the combination of outputs from said antennas has a substantially constant level regardless of the position and attitude of the airplane during receipt of the satellite broadcast.

2. A mobile receiver according to claim 1, wherein said antennas are mounted on a fuselage, externally of a pressurized area of the airplane.

3. A mobile receiver for a satellite broadcast that includes a video image signal, comprising:
   a radome having a lightning arrester mounted thereon;
   a plurality of directional planar antennas constructed to receive the satellite broadcast, said directional planar antennas being covered by said radome and mounted to corresponding drives that adjust inclinations and rotation angles of the respective directional planar antennas;
   an inertial navigation unit for generating a navigation signal representing a position and an attitude of an airplane;
   control means for generating an antenna control signal for controlling the antenna drives, based on the navigation signal from said navigation unit and pre-stored information indicating a position of the satellite, the antenna drives adjusting the inclination and rotation angles of said directional planar antennas in accordance with the antenna control signal from said control means to orient said directional planar antennas toward the satellite; and
   composition means for in-phase combining outputs from said directional planar antennas in an intermediate frequency (IF) band;
   said lightning arrester including a metal member oriented longitudinally of said radome and a plurality of metal members oriented laterally of said radome and crossing said longitudinally oriented metal member at crossing points spaced longitudinally along said radome,
   the metal members of said lightning arrester being disposed relative to said directional planar antennas such that each of said directional planar antennas is situated beneath a corresponding crossing point, and such that the combination of outputs from said directional planar antennas has a substantially constant level regardless of the position and attitude of the airplane during receipt of the satellite broadcast.

4. A mobile receiver according to claim 3, wherein the number of said antennas is two and the number of said laterally oriented metal members is four, and two of said laterally oriented metal members have positions, along a longitudinal direction of said radome, between those of the two antennas.

5. A mobile receiver according to claim 3, wherein there are two of said laterally oriented metal members disposed between each adjacent pair of said antennas along a longitudinal direction of said radome.

6. A mobile receiver according to claim 3, wherein the crossing point corresponding to each antenna is substantially coincident with a rotation axis of that antenna.

7. A mobile receiver according to claim 1, wherein the number of said antennas is two and the number of said laterally oriented metal members is four, and two of said laterally oriented metal members have positions, along a longitudinal direction of said radome, between those of the two antennas.

8. A mobile receiver according to claim 1, wherein there are two of said laterally oriented metal members disposed between each adjacent pair of said antennas along a longitudinal direction of said radome.

9. A mobile receiver according to claim 1, wherein the crossing point corresponding to each antenna is substantially coincident with a rotation axis of that antenna.

10. A mobile receiver according to claim 3, wherein said antennas are mounted on a fuselage, externally of a pressurized area of the airplane.

11. A mobile receiver for a satellite broadcast that includes a video image signal, comprising:

a radome having a lightning arrester mounted thereon;

a plurality of directional antennas constructed to receive the satellite broadcast, said antennas being covered by said radome and mounted to corresponding drives that adjust inclinations and rotation angles of the respective antennas;

an inertial navigation unit for generating a navigation signal representing a position and an attitude of an airplane;

control means for generating an antenna control signal for controlling the antenna drives, based on the navigation signal from said navigation unit and pre-stored information indicating a position of the satellite, the antenna drives adjusting the inclinations and rotation angles of said antennas in accordance with the antenna control signal from said control means to orient said antennas toward the satellite; and composition means for in-phase combining outputs from said antennas in an intermediate frequency (IF) band;

said lightning arrestor including a metal member oriented longitudinally of said radome and a plurality of metal members oriented laterally of said radome and crossing said longitudinally oriented metal member at crossing points spaced longitudinally along said radome, the metal members of said lightning arrestor being disposed relative to said antennas such that each antenna is situated beneath a corresponding crossing point, and such that the combination of outputs from said antennas has at least the same or larger than an output C/N of any single one of said antennas regardless of the position and attitude of the airplane during receipt of the satellite broadcast.

12. A mobile receiver according to claim 11, wherein the number of said antennas is two and the number of said laterally oriented metal members is four, and two of said laterally oriented metal members have positions, along a longitudinal direction of said radome, between those of the two antennas.

13. A mobile receiver according to claim 11, wherein there are two of said laterally oriented metal members disposed between each adjacent pair of said antennas along a longitudinal direction of said radome.

14. A mobile receiver according to claim 11, wherein the crossing point corresponding to each antenna is substantially coincident with a rotation axis of that antenna.

15. A mobile receiver according to claim 11, wherein said antennas are mounted on a fuselage, externally of a pressurized area of the airplane.

16. A mobile receiver for a satellite broadcast that includes a video image signal, comprising:

a radome having a lightning arrester mounted thereon;

a plurality of directional planar antennas constructed to receive the satellite broadcast, said directional planar antennas being covered by said radome and mounted to corresponding drives that adjust inclinations and rotation angles of the respective directional planar antennas;

an inertial navigation unit for generating a navigation signal representing a position and an attitude of an airplane;

control means for generating an antenna control signal for controlling the antenna drives, based on the navigation signal from said navigation unit and pre-stored information indicating a position of the satellite, the antenna drives adjusting the inclination and rotation angles of said directional planar antennas in accordance with the antenna control signal from said control means to orient said directional planar antennas toward the satellite; and composition means for in-phase combining outputs from said directional planar antennas in an intermediate frequency (IF) band;

said lightning arrester including a metal member oriented longitudinally of said radome and a plurality of metal members oriented laterally of said radome and crossing said longitudinally oriented metal member at crossing points spaced longitudinally along said radome, the metal members of said lightning arrester being disposed relative to said directional planar antennas such that each of said directional planar antennas is situated beneath a corresponding crossing point, and such that the combination of outputs from said directional planar antennas has at least the same or greater than an output C/N of any single one of said directional planar antennas regardless of the position and attitude of the airplane during receipt of the satellite broadcast.

17. A mobile receiver according to claim 16, wherein the number of said antennas is two and the number of said laterally oriented metal members is four, and two of said laterally oriented metal members have positions, along a longitudinal direction of said radome, between those of the two antennas.

18. A mobile receiver according to claim 16, wherein there are two of said laterally oriented metal members disposed between each adjacent pair of said antennas along a longitudinal direction of said radome.

19. A mobile receiver according to claim 16, wherein the crossing point corresponding to each antenna is substantially coincident with a rotation axis of that antenna.

20. A mobile receiver according to claim 16, wherein said antennas are mounted on a fuselage, externally of a pressurized area of the airplane.

* * * * *